Dec. 29, 1970 M. PASBRIG 3,551,883

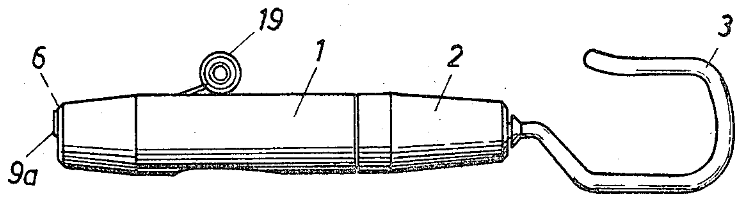
FIG. 1
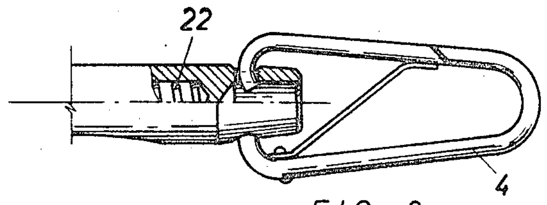
FIG. 2
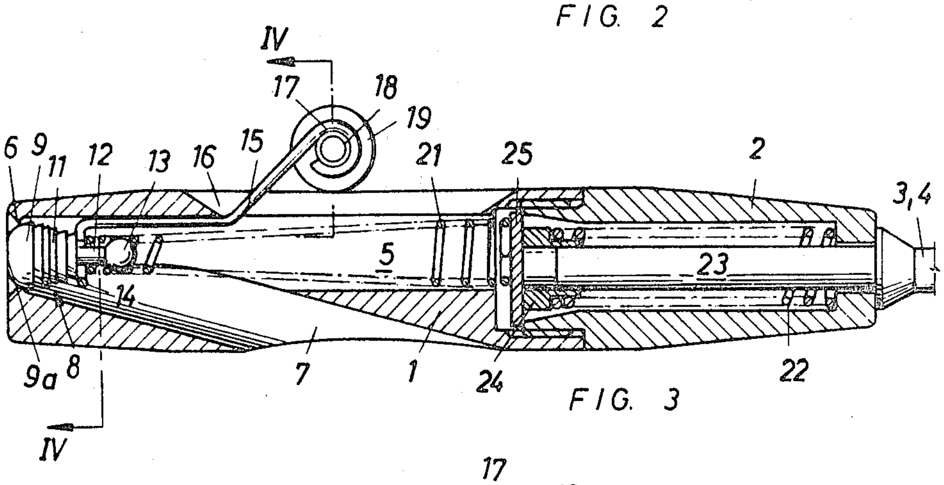
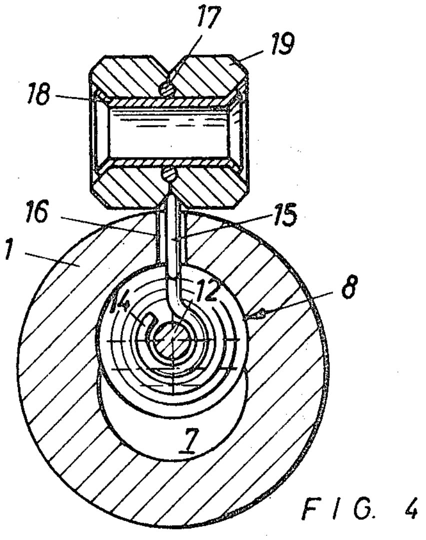
FIG. 3
FIG. 4

CLAMPING DEVICES

Filed Jan. 26, 1968 4 Sheets-Sheet 2

Dec. 29, 1970 M. PASBRIG 3,551,883

CLAMPING DEVICES

Filed Jan. 26, 1968 4 Sheets-Sheet 3

United States Patent Office 3,551,883

Patented Dec. 29, 1970

3,551,883

CLAMPING DEVICES

Max Pasbrig, Allmandstrasse 15, Leutkirch, Germany

Filed Jan. 26, 1968, Ser. No. 700,933
Int. Cl. H01r 7/06; F16g 11/04
U.S. Cl. 339—273 25 Claims

ABSTRACT OF THE DISCLOSURE

An improved device for releasably clamping flexible, elongated connecting elements for connecting such elements to each other or for mounting them on a fixed stationary anchorage, comprising a tubular, self-locking and releasable element in which the tensioned section of the connecting element passes through an opening in one end face of the tubular element and the tensionally relieved section through a lateral hole in the said tubular element.

There are known clamping devices for cables and ropes operating with screws and eccentrics. In these devices, the cable or rope is subject to be damaged by high clamping stresses so that, on retightening or releasing the cable, such damaged part may be located outside the clamp and may fracture or lose its electrical conductivity. Moreover, screws and eccentrics may slacken under vibration, such as, e.g., in overhead lines under the force of the wind.

There are also known self-locking clamping devices with or without auxiliary springs and adapted to different purposes, properties and diameters connecting elements and tensile stresses. These are used, e.g., for tightening clothes lines, cordons, lines in sailing vessels, cables for erecting and supporting scaffolding, towers, cranes and the like, and for many other applications.

It is the main object of the invention to provide a device of the kind hereinbefore described, in which effective and self-locking clamping action is combined with simple and easy introduction, retensioning and release of the connecting element.

It is a further object of the invention to provide a device of this type in the form of a sleeve, wherein the tensioned section of the connecting element passes through an opening in the end face of the sleeve and the tensionally relieved section through a lateral opening of the sleeve.

It is a further object of the invention to provide an actuating mechanism attached to the outer shell of the sleeve and axially movable thereon for releasing the self-locking action of the device.

It is a further object of the invention to provide a sleeve-shaped or tubular element, for tensioning a flexible connecting element, such as, a chord, line, hose, cable, hawser, wire rope, or an electrical overhead line and the like, on a fixed anchorage, e.g., a wall ring, and having at one end an inlet opening for the tensioned section and a lateral outlet opening for the tensionally relieved section of the connecting element, and having at the end remote from the inlet opening a hook or another suitable part for fixing to the anchorage point.

It is a further object of the invention to provide a tubular or sleeve-shaped element which is suitable for interconnecting the said flexible element and having in each end face an inlet opening for the tensioned sections and in the shell two outlets for the relieved sections of the connecting elements.

According to the invention, the shell of the sleeve has at least one bore extending obliquely to the axis of the sleeve, through which the tensionally relieved part of the element leaves the sleeve.

In a preferred embodiment, the shell of the sleeve is provided with a slot in which an actuating member for the clamping element is axially displaceably mounted. Preferably, this slot is arranged on the side of the sleeve opposite the said bore.

In a particularly preferred embodiment of the invention, the clamping element consists of a shouldered or stepped cylindrical body, resting with a larger, rounded off, end face from the inside on the inwardly drawn rim of the opening of the end face of the sleeve, whilst its other end face has a spherical configuration, and a spring is so hooked into this end that the clamping member can carry out a tilting or tipping movement and to rest with its shoulders or steps on the connecting element, thereby to effectively retain the same.

Further features of the invention will become apparent from the following description thereof with reference to the accompanying drawing of preferred embodiments, and from the appended claims.

In the drawings:

FIG. 1 shows a first embodiment of the clamping device according to the invention;

FIG. 2 is a partly sectional partial view of a modification of the embodiment of FIG. 1;

FIG. 3 is a cross-section of the FIG. 1 embodiment of the clamping device on an enlarged scale;

FIG. 4 is a cross-section of the same embodiment on a yet larger scale;

Figure 6:
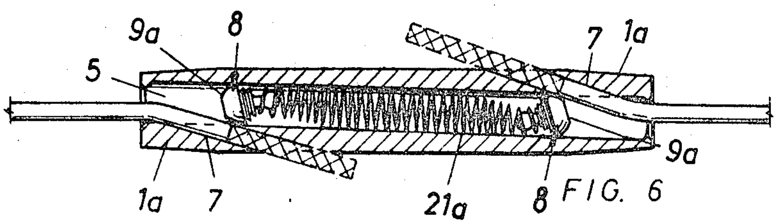
FIG. 6 is a cross-section of a third embodiment.
Figure 7:
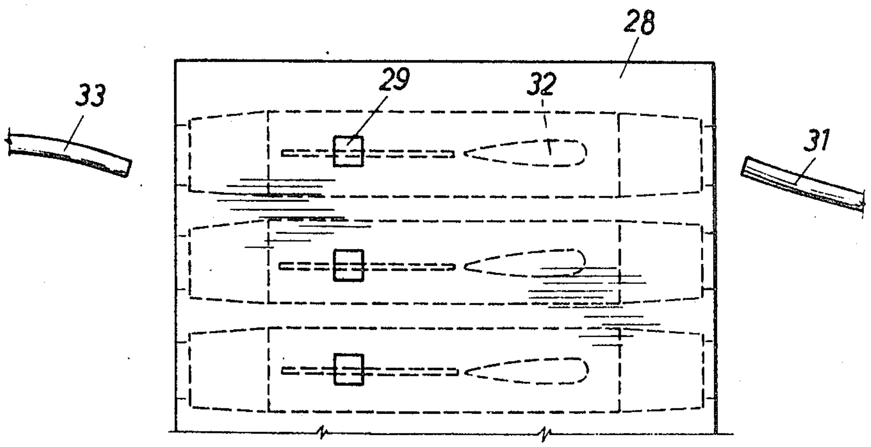
Figure 7B:
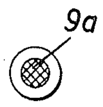
Figure 7A:
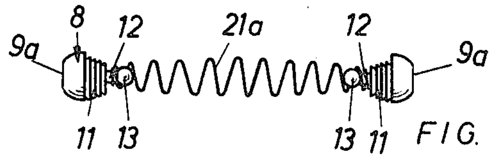
Figures 6A, 6B, 8:
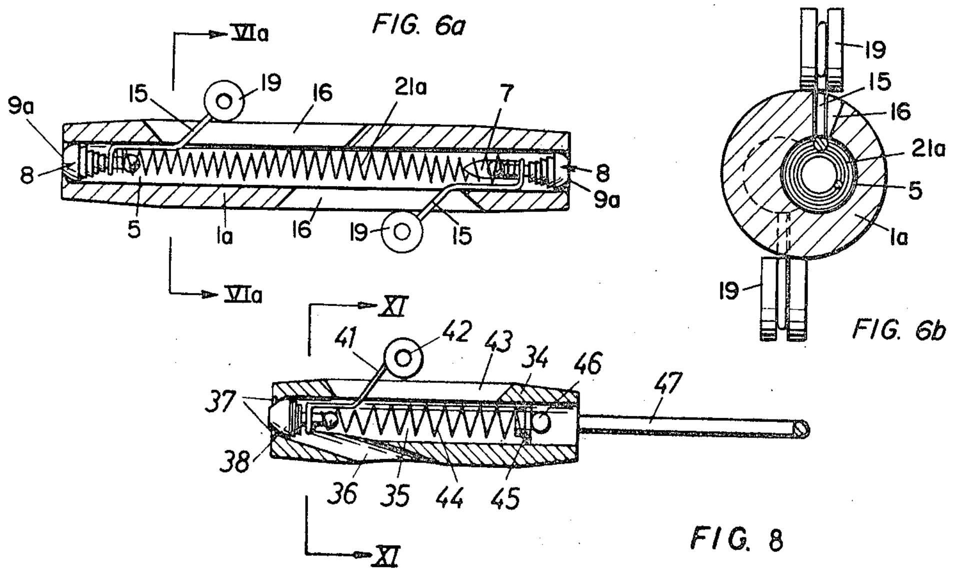
Figure 9:
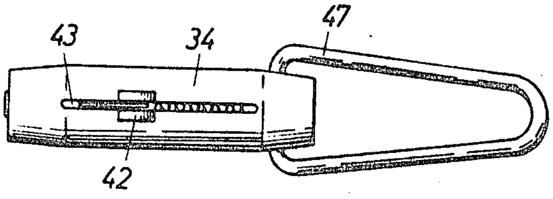
Figure 10:
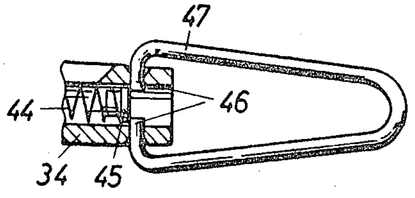
Figure 11:
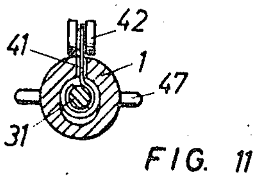
Figure 12:
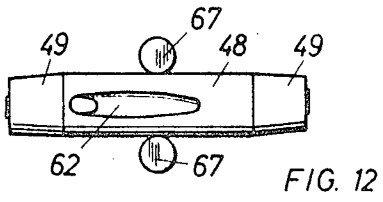
Figure 13:
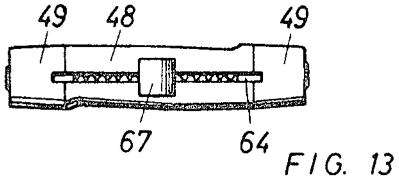
Figure 14:
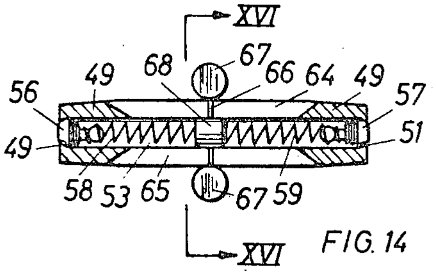
Figure 15:
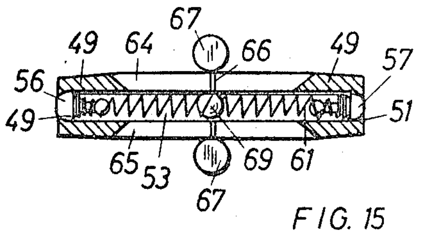
Figure 16:
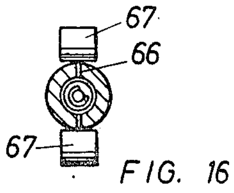
Figure 17:
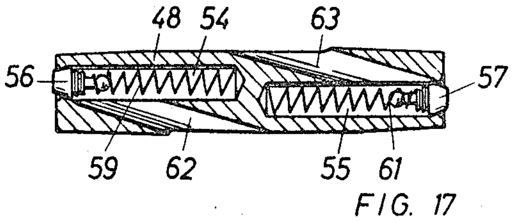

FIG. 6*a* shows the embodiment of FIG. 6 with an actuating mechanism, and rotated through an angle of 90 degrees;

FIG. 6*b* is a cross-section along the line VII—VII in FIG. 6 on an enlarged scale;

FIG. 7 is a top view of a fourth embodiment, comprising several clamping devices in side-by-side arrangement;

FIG. 7*a* shows a helical spring with clamping members;

FIG. 7*b* is a front elevation of a clamping member;

FIG. 8 is a cross-section of a fifth embodiment of the invention;

FIG. 9 shows the fifth embodiment, rotated through an angle of 90 degrees relative to FIG. 8;

FIG. 10 is a partial section of FIG. 9;

FIG. 11 is a cross-section along the line XI—XI in FIG. 8;

FIG. 12 is a side elevation of a sixth embodiment;

FIG. 13 is a side elevation of the sixth embodiment rotated through an angle of 90 degrees relative to the view in FIG. 12;

FIG. 14 is a cross-section of the sixth embodiment;

FIG. 15 is a cross-section of a modification of this embodiment;

FIG. 16 is a cross-section along the line XVI—XVI in FIG. 14;

FIG. 17 is a cross-section of a seventh embodiment of the invention.

The embodiment shown in FIGS. 1 to 4 comprises a tubular sleeve member 1 on to which is screwed an end member 2, equipped in the embodiment of FIG. 1 with a hook 3, or in the modification of FIG. 2 with a snap hook 4.

As may best be seen from FIG. 3, the sleeve has an inner bore 5 tapering in the direction of the end face 6 of the sleeve. This inner bore is not exactly concentric relative to the outer shell of the sleeve, and is eccentrically offset towards one side. On the side of the sleeve with the thicker wall, the sleeve has an oblique bore 7, forming an acute angle, preferably between 15° and 20° with the axis of the inner bore 5.

The chamber common to the bores 5 and 7 houses a clamping member 8, having a head 9, resting on the narrower end face 6 (seen best in FIG. 7*b*), which is flattened and has a serrated or otherwise roughened end face 9*a*. Behind the head 9, the diameter of the clamping member is reduced as at 11 in steps to form a neck 12, which terminates in a spherical end 13. A looped end 14 of an angled piece of wire 15 is fitted into the neck 12; this piece of wire passes through a guide slot 16 in the shell of the sleeve. The outer end of this angled piece of wire 15 is also formed into a loop 17 and embraces a roller 18 carrying a grip roller 19, preferably in the shape of a twin roller.

The bore 5 contains a spring 21 which urges the clamping member 8 in the direction of the swaged end 6 of the sleeve. The forward end of the spring 21 is so hooked into the spherical end 13 of the clamping member as to permit the same to effect a tilting movement in the direction of the oblique bore 7. This arrangement is of particular importance for the invention. The angled, bent piece of wire 15 follows this tilting movement, causing the grip roller 19 to project at somewhat more above the shell of the sleeve. The spring 21 is a conical spring, the outer turns of which have a somewhat smaller diameter than the ball 13. During the assembly, the ball 13 is pressed into the turns of the spring.

For introducing a rope, a cable, or another connecting element stressed under tension, the grip roller 19 is pressed towards the hook 3 or snap hook 4. The connecting element is then introduced through the opening in the end face so that its end passes through the oblique bore 7. When the grip rollers 19 are released, the spring 21 presses the clamping member 8 against the connecting element. The clamping member 8 tilts under the action of the tension affecting the connecting element, so that the stepped parts 11 makes contacts with the connecting element. The tension affecting the connecting element is transferred via the steps or shoulders 11 to the clamping member 8 causing the connecting element to be clamped between the clamping member and the wall of the bore 7 in a self-locking and non-slipping manner.

It is a particular advantage of the device according to the invention that the immediate re-tensioning of the connecting element is possible. To this end, the end of the element protruding from the oblique bore 7 is gripped and pulled. The self-locking action becomes effective immediately, when the connecting element is again released. For releasing or relieving the connecting element, the grip roller 19 is pushed forward, causing the clamping member 8 to be compressed against the force of the spring 21.

The embodiment represented in FIGS. 1 to 3 has the further advantage that the hook 3 or snap hook 4 is movable against the action of a spring 22. Thus, the spring 22 ensures the constant tension of the connecting element, as well as faciiltating the engagement of the hook into an eye or ring.

The details of the construction may be seen from FIG. 3. The hook 3 or 4 has a shank 23 with a nut 24 screwed onto its end. The nut 24 rests on one side of a dividing plate 25, the other side of which supports the spring 21.

Figure 5:
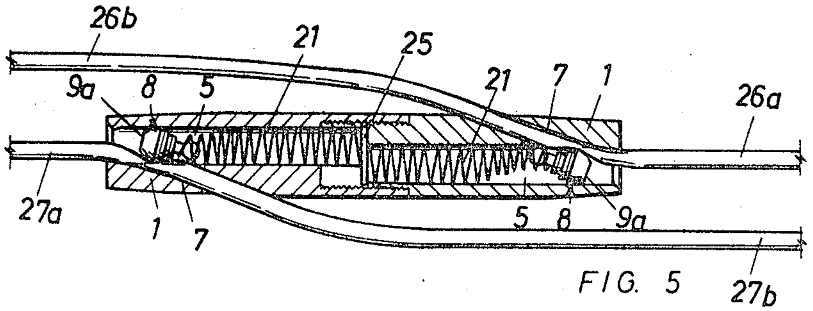
FIG. 5 is a cross-section of a second embodiment.

In the embodiment of FIG. 5, two sleeves 1 are screwed together via a separating plate 25; the axes of the eccentric bores in the sleeves 1 are offset relative to each other as far as possible. The two tensioned sections 26*a* and 27*a* of the two connecting elements are therefore almost aligned. The relieved end sections are shown at 26*b* and 27*b* respectively. For disconnecting a joint made in this way, a tool, such as a mandrel, may be fitted to the serrated end face 9*a* of the clamping member 8 and the same may be compressed.

In the embodiment of FIGS. 6 and 6*a*, grip rollers 19 are provided for counteracting the self-locking action; these grip rollers are equipped with bent wires 15 and constructed as illustrated in the embodiment of FIG. 3. The guide slots 16 for the wires 15 are located on opposite sides of an integrally formed sleeve 1*a*, and offset through 90° relative to the oblique bores 7 which are also located on opposite sides of the sleeve. In addition, the guide slots 16 are conical to enable the associated piece of wire 15 to follow the tilting of the corresponding clamping member 8 in order to produce the self-locking action. The clamping members 8 are pressed into the ends of a spring 21*a* which, as shown best in FIG. 7*a*, has conical shape with its maximum diameter in the middle. The pitch of this spring varies in such a way that the spacing between the turns is wider in the centre than at the ends. The inner bore of the sleeve 1*a* is slightly oblique. One of the two ends of the sleeve may be narrower and the other is flanged over after insertion of the spring 21*a*. This embodiment is particularly cheap and may be used therefore for small parts, such as the manufacture of porcelain insulators and the like.

The arrangement shown in FIG. 7 comprises a larger number of clamping devices, arranged in parallel one adjacently to the other, for example in a plastic block 28. Such an arrangement may be used for mounting a larger number of flexible, elongated connecting elements such as, e.g., ropes or conductors. The ends 31 of the connecting elements, fitted from the right as viewed in FIG. 7, are bent upwardly and pass out through holes 32, whilst the ends 33 fitted from the left pass out downwardly. Where the arrangement is to be used as a contact device for electrical purposes, the openings 32 of the oblique bores are covered by the plastic block, forming an abutment for a bare end of a conductor. This arrangement ensures a good contact whilst preventing bare wire from being located outside the device, provided that the wire insulation has been removed over a predetermined length.

The embodiment of the invention shown in FIGS. 8 to 11 comprises an integral sleeve 34 with a continuous internal bore 35. The wall of the sleeve 34 contains an obliquely extending bore 36 terminating near one narrower end opening 37. The restriction of this opening may be produced by flanging. It is also possible to withdraw the drilling tool, operating from the right to the left as viewed in the drawing, before it has completed the end face opening 37. The chamber common to both bores 35 and 36 contains a clamping member 38, having a stepped diameter and a shank 31. A piece of wire 41, carrying an actuating roller 42, is hooked into the shank 31 and is guided in a slot 43 extending along the axial direction of the sleeve 34. The inner bore 35 houses a spring 44, resting with one end on a disc 45 whilst its other end is hooked into the spherically shaped end of the shank 31. The end of the sleeve remote from the end opening 37 is provided with radial bores into which are hooked the ends 46 of a hook 47. Since the ends 46 of the hook 47 extend to the inner bore 35 of the sleeve 34, they act as locking arrangement and abutment for the disc 45. This results in an easy assembly, that is to say, the spring 44 with the clamping member 38, the wire 41 and the disc 45 are fitted into the inner bore 35. Then, the hook 47 is pushed over the slightly conical end of the sleeve 34, causing the hook to expand until the ends 46 engage into the bores. During this operation, the disc 45 is retained by a suitable tool. Finally, the actuating roller 42 is fitted to the wire 41.

The device shown and described is fitted to the end of a connecting element, e.g., a rope, by pushing the actuating roller 42 in the direction of the hook 47. The end of the rope is introduced into the end opening 37 until it projects from the oblique bore 36. The rope end, weighted with the device, can now be thrown, for example, for bridging water ditches or other obstacles. Its hook 47 is then hooked into a suitable anchorage. Then the rope end is tightened, causing the clamping member to move back. When the desired tension has been reached, the clamping member locks the rope automatically in the oblique bore 36.

Obviously, the hook may be replaced by any other suitable fixing means, such as, for example, snap hooks, shackles, or the like.

The device illustrated in FIGS. 12 to 17 consists of an integral sleeve 48 whose ends 49 are turned slightly conically. The ends of the sleeve 48 have openings 49 and 51 facing each other. In the embodiment of the invention shown in FIGS. 12 to 16, the sleeve has a single continuous internal bore 53, whilst the embodiment of FIG. 17 has two internal bores 54 and 55 in mutually offset arrangement. The diameters of the end openings 51 and 52 are reduced by flanging compared with the diameter of the bores 53, 54 and 55 in order to prevent the clamping members 56 and 57, fitted prior to the flanging over, from being lost.

In the embodiment of FIG. 14, the clamping member 56 is associated with a spring 58 and the clamping member 57 with a spring 59. The embodiment of FIG. 15 comprises only a single spring 61 which actuates both clamping members 56 and 57. The sleeve 48 has two diametrically opposite, obliquely extending bores 62 and 63 passing through the wall of the sleeve and forming acute angles of about 15 to 20° with the associated inner bores 53, and 54, 55, respectively. The oblique bores 62 and 63 terminate in the inner bores 53 or 54, 55 near the end openings 51 and 52. In the embodiment of FIGS. 12 to 16, slots 64 and 65 are arranged in a plane located at an angle of 90° to the plane containing the oblique bores 62 and 63, and pins 66 are displaceably guided in these slots in the axial direction of the sleeve. These pins carry roller-shaped actuating handles 67.

In the embodiment shown in FIG. 14, there is provided a cylindrical guide member 68, sliding in the inner bore 53. The ends of the springs 58 and 59 are hooked into this guide member 68. The ends of the pins 66 can be plugged or screwed into the guide member 68. However, in a preferred embodiment, a longer pin 66, carrying an actuating roller 67, is pushed through a hole in the guide member 68, and the other actuating roller is then fitted over the other, free end of this pin 66. The most convenient embodiment will always depend on the dimensions of the sleeve 48. Thus, the length of the sleeve may vary between, say 10 millimetres, for example, for connecting thin stranded wires, and 2 metres, e.g., for heavy load-carrying cables.

The embodiment shown in FIG. 15 may be manufactured particularly cheaply. In this embodiment, a guide ball 69 with a diameter slightly larger than the winding diameter of the spring 61, is pressed between two turns of the spring 61. The ball 69 is fitted in this manner prior to the insertion of the spring into the inner bore 53. After the insertion of the spring 61 with the clamping members 57 and 56, and either before or after the flanging over of the end openings 51, 52, the rollers are inserted. Obviously, one of the end openings 51 or 52 may be made narrower during the manufacture, e.g., by not completing bore; then only the other end opening is flanged over.

In the embodiments illustrated in FIGS. 12 to 16, for introducing the ends of the two connecting elements through the end openings 51 and 52, first, one clamping member 56 is withdrawn by means of the actuating handles 67. The connecting element is so introduced that its end issues from the oblique bore 62.

Next, the actuating handles 67 are pushed in the other direction and the end of the other connecting element is inserted through the end opening 52 in such a manner that it protrudes from the other oblique bore 63. For retensioning the connecting elements in order to reduce their total length or to increase the tension of the whole line, the actuating handles 63 need not be operated. When the end projecting from the oblique bores 62 and 63, respectively, are pulled, the clamping members 56 and 57, respectively, give automatically. If a release is to be effected in order to relieve the tension or extend the total length of the line, the actuating handles 67 are displaced in one or the other direction, according to the end which is to be released.

In the embodiment of FIG. 17, a tool, such as a screwdriver or rod, is necessary for inserting the ends of the connecting elements or for releasing the same, whereby the clamping members 56 and 57 are pushed back.

Under the pull of the connecting members, the clamping members 56 and 57 position themselves obliquely in the direction of the associated bores 62, 63, causing all steps or shoulder to engage the connecting element. Accordingly, the same is pressed against the wall of the corresponding oblique bore 62 or 63. Since the locking force rises as a function of the tension affecting the connecting element, very high tensile forces can be transmitted. The tensile force is limited only by an expansion of the inner bore of the sleeve in extreme cases.

Thus, the present invention provides a device which meets all requirements, combined with a very cheap manufacture and assembly. The devices are suitable for very widely differing applications. They may be arranged in groups, for connecting larger numbers of ropes of cables and the like, or tensioning the same. The lengths of the connecting elements may vary between a few millimetres up to one metre and more, the heavy constructions serving, for example, for clamping anchoring cables or tensioning high-voltage overhead lines.

In all embodiments, the clamping member 8 or 9 has a head, the diameter of which is slightly larger than the end opening, and a spherically formed end of the shank. The diameter of the ball at the end of the shank is substantially smaller, amounting, for example, only to one half of the diameter of the inner bore. Stepped shoulders are located between the end of the shank and the head. At least a part of the last turn of the spring is narrower so that the diameter of the turn is smaller than that of the ball-shaped shank end. In consequence, the clamping member cannot be lost from the spring during the assembly, whilst leaving sufficient freedom after the assembly for abutting on the fitted connecting element. During this operation, the clamping member positions itself generally obliquely so that its axis assumes an angular position between the axis of the inner bore and the axis of the associated oblique bore, and generally nearer the latter than the former. This functional mechanism substantially improves the value of the device according to the invention.

The invention is not limited to the embodiments shown and described and permits of many modifications without thereby departing from its principles.

I claim:

1. A device for detachably mounting a flexible, elongated, connecting element on a fixed anchorage, comprising a cylindrical sleeve with a continuous inner bore and a bore passing obliquely through the wall of the sleeve and terminating near one end opening thereof; a clamping member with a diameter slightly larger than the end opening of the sleeve; a spring arranged within the inner bore of the sleeve and pressing the clamping member against the end opening; and a hook mounted on the sleeve.

2. A device as set forth in claim 1, wherein the sleeve has two opposite radial bores adapted to engage the ends of the said hook.

3. A device as set forth in claim 2, wherein the spring rests with its end remote from the clamping member on a disk which is retained by the ends of the hook passing through the said radial bores.

4. A device for detachably interconnecting two flexible, elongated connecting elements, comprising a cylindrical sleeve including an inner bore with opposite end openings adapted to receive the incoming sections of the two connecting elements and with lateral oblique openings through the sleeve walls and communicating with said bore adjacent the end openings through which the relieved ends of the elements protrude; clamping members in said bores, the diameters of which are larger than the diameters of the end openings in the sleeve; and at least one spring urging the clamping members towards the associated end openings.

5. A device as set forth in claim 4, wherein the sleeve is made in one piece, having a continuous bore and two oblique bores passing through its wall.

6. A device as set forth in claim 5, wherein the bores passing obliquely through the wall of the sleeve are positioned diametrically opposite each other.

7. A device as set forth in claim 4, wherein the sleeve is equipped with two diametrically opposite slots and the plane containing these slots forms an angle of substantially 90° with the plane containing the axes of the oblique bores through the wall of the sleeve, and comprising a guide pin in the inner bore equipped with pins, extending outwardly through the slots and carrying actuating members on their outer ends.

8. A device as set forth in claim 4, wherein a single spring is arranged in the inner bore, carrying at each end one clamping member, and wherein a spherical guide member is fitted in the center of the spring between two spring turns and is equipped with pins.

9. Device for detachably clamping at least one connecting element comprising at least one housing having an elongated chamber with an opening through one wall thereof, at least one clamping member, an associated yieldable resilient compression means biasing said clamping member toward said opening, said clamping member being tiltably attached to said biasing means, a second elongated chamber oblique to said first chamber and communicating with said first chamber in the area of said clamping means, one of the two chambers receiving the clamping member and the associated yieldable resilient means and the other chamber receiving the connecting element.

10. A device as set forth in claim 9, wherein the axis of the oblique bore forms an angle of 15° to 20° with the axis of the inner bore.

11. A device according to claim 9 comprising a plurality of said housings mounted in spaced relationship from each other on a plastic strip in which they are embedded.

12. A device as set forth in claim 9, in which a plurality of said housings are located in spaced relationship from one another, having each at its two end faces openings for inserting the bare ends of electrical cables, and wherein the housings are so embedded in an insulating material that the outer openings of the oblique bores are covered by the said material, thereby to limit the depth of penetration of the conductor ends, and wherein the side towards which the oblique bore extends is marked.

13. A device as set forth in claim 9, wherein the oblique bores are blind bores, the depth of which is such as to produce a good electrical contact between an inserted conductor end and the clamping member.

14. A device as set forth in claim 9, wherein the clamping member has a serrated or rough end face facing the end opening.

15. A device as set forth in claim 9, wherein the end opening of the sleeve is reduced by flanging.

16. A device as set forth in claim 9, wherein the sleeve is formed in two parts and wherein the two parts are connected by welding.

17. The device of claim 9 wherein the housing is a cylindrical sleeve.

18. A device as set forth in claim 17, wherein the shell of the sleeve has at least one guide slot, and comprising an actuating member for the clamping member and adapted to slide axially within the said guide slot.

19. A device as set forth in claim 17, wherein the sleeve is made integrally, with the elongated chamber extending from one end opening thereof to the other, and wherein a single spring is arranged within the elongated chamber, carrying at either end one said clamping member.

20. A device as set forth in claim 17, wherein the sleeve has two mutually offset elongated chambers and a spring with a clamping member is mounted in each elongated chamber.

21. A device as set forth in claim 18, wherein the clamping member is a cylindrical body with stepped shoulders, the head of which has a diameter larger than the end opening of the sleeve and having at its other end a small ball with a spring hooked into the said ball.

22. A device as set forth in claim 21, comprising a neck between the ball and the stepped portion of the clamping member, and wherein the actuating member for the clamping member is an angled bent wire, one end of which is bent to embrace the said neck.

23. A device as set forth in claim 22, wherein an actuating handle is fitted into the outer, looped end of the said wire.

24. A device as set forth in claim 21, wherein the spring is a conical spring, the maximum diameter of which corresponds substantially to the diameter of the inner bore, and the smallest diameter of which is somewhat smaller than the diameter of the spherical end of the clamping member.

25. A device as set forth in claim 24, wherein the pitch in the spring is varied so that the turns at the end are more tightly spaced that the larger diameter turns in the center.

References Cited

UNITED STATES PATENTS

| | | | |
|---|---|---|---|
| 1,061,330 | 5/1913 | Self | 24—126.2UX |
| 1,921,627 | 8/1933 | Lucchesi | 24—126.2UX |
| 2,236,506 | 4/1941 | Hirsch | 24—126.2UX |

BERNARD A. GELAK, Primary Examiner

U.S. Cl. X.R.

24—126; 339—248